(12) United States Patent
Deng et al.

(10) Patent No.: US 12,117,208 B2
(45) Date of Patent: Oct. 15, 2024

(54) GAS-FIRED STEAM BOILER WITH GAP STRUCTURE

(71) Applicant: Xi'an Jiaotong University, Xi'an (CN)

(72) Inventors: Shifeng Deng, Xi'an (CN); Qinxin Zhao, Xi'an (CN); Huaishuang Shao, Xi'an (CN); Yungang Wang, Xi'an (CN); Zhiyuan Liang, Xi'an (CN)

(73) Assignee: Xi'an Jiaotong University, Xi'an (CN)

( * ) Notice: Subject to any disclaimer, the term of this patent is extended or adjusted under 35 U.S.C. 154(b) by 0 days.

(21) Appl. No.: 17/869,967

(22) Filed: Jul. 21, 2022

(65) Prior Publication Data
US 2024/0183579 A1 Jun. 6, 2024

Related U.S. Application Data

(63) Continuation of application No. PCT/CN2021/107905, filed on Jul. 22, 2021.

(30) Foreign Application Priority Data

Mar. 29, 2021 (CN) .......................... 202110331551.6

(51) Int. Cl.
*F24H 8/00* (2022.01)
*F24H 1/43* (2022.01)
*F24H 9/00* (2022.01)

(52) U.S. Cl.
CPC ............... *F24H 8/006* (2013.01); *F24H 1/43* (2013.01); *F24H 9/0026* (2013.01)

(58) Field of Classification Search
CPC ..................................... F28B 1/00; F28B 1/02
USPC ......................................................... 122/13.1
See application file for complete search history.

(56) References Cited

U.S. PATENT DOCUMENTS

| | | | | |
|---|---|---|---|---|
| 3,701,340 A | * | 10/1972 | Miller | F24H 1/40 431/348 |
| 4,403,572 A | * | 9/1983 | Gerstmann | F28D 20/0039 165/125 |
| 4,453,496 A | * | 6/1984 | Yoshinari | F22B 21/065 122/18.4 |
| 4,825,813 A | * | 5/1989 | Yoshinari | F28F 1/24 122/18.4 |
| 2019/0041092 A1 | * | 2/2019 | Niu | F24H 1/205 |

FOREIGN PATENT DOCUMENTS

| | | |
|---|---|---|
| CN | 202057228 U | 11/2011 |
| CN | 104501639 A | 4/2015 |
| CN | 205208916 U | 5/2016 |
| CN | 107559792 A | 1/2018 |

(Continued)

*Primary Examiner* — Steven B McAllister
*Assistant Examiner* — John E Bargero

(57) ABSTRACT

A gas-fired steam boiler, including multiple heat exchange tubes, an upper steam header, a lower steam header, a casing, a burner, a condenser, a chimney, and a controller. The heat exchange tubes are vertically arranged to form an annular tube row. A space enclosed by the annular tube row is configured as a furnace. Adjacent two heat exchange tubes are combined to form a gap channel evenly distributed along a circumferential direction. A width of the gap channel is 0.1-4 mm, and a circumferential length of the gap channel is 50-300 mm. A length of the gap channel along an axial direction of the heat exchange tube is the same as a length of the heat exchange tube.

8 Claims, 10 Drawing Sheets

(56) References Cited

FOREIGN PATENT DOCUMENTS

| | | |
|---|---|---|
| CN | 207049894 U | 2/2018 |
| CN | 107781800 A | 3/2018 |
| CN | 208058822 U | 11/2018 |
| CN | 109099588 A | 12/2018 |
| CN | 109855286 A | 6/2019 |
| CN | 109883051 A | 6/2019 |
| CN | 110220305 A | 9/2019 |
| CN | 210831977 U | 6/2020 |
| CN | 111829179 A | 10/2020 |
| CN | 112460567 A | 3/2021 |
| FR | 2907539 B1 | 4/2013 |
| JP | 2014052167 A | 3/2014 |

\* cited by examiner

GAS-FIRED STEAM BOILER WITH GAP STRUCTURE

CROSS-REFERENCE TO RELATED APPLICATIONS

This application is a continuation of International Patent Application No. PCT/CN2021/107905, filed on Jul. 22, 2021, which claims the benefit of priority from Chinese Patent Application No. 202110331551.6, filed on Mar. 29, 2021. The content of the aforementioned application, including any intervening amendments thereto, is incorporated herein by reference in its entirety.

TECHNICAL FIELD

This application relates to gas-fired boilers, and more particularly to a gas-fired steam boiler with a gap structure.

BACKGROUND

In recent years, the smog problem has persistently threatened the ecological environment. Although coal-fired boilers with a steam ton below 35 have been completely eliminated in urban areas, a large number of industrial boilers with a steam ton of 0.1-10 are still needed in hotels, laundries, breweries, feed mills and district heating, and natural gas or electricity can be used as the energy source for those industrial boilers. The fuel cost of electric steam boilers is about 80-120% higher than that of gas-fired steam boilers. As a result, the gas-fired steam boilers dominate the market of high-power steam boilers with a steam ton of 0.5-10. The gas-fired steam boilers are mostly used in urban areas, where the boiler room space is small. Therefore, the gas-fired steam boilers are required to be space-saving, high-efficient to reduce operating costs, and boiler-water-saving to reduce heat loss caused by frequent start and stop.

Chinese Patent Application No. 201710865076.4 filed by Henan Sitong Boiler Co., Ltd. and Chinese Patent Publication No. 107781800A filed by Shanghai Yangnuo Boiler Manufacturing Co., Ltd. disclose a cross-flow boiler, which is a gas-fired steam boiler with a relatively compact size. Compared with the WNS gas-fired steam boiler, the volume of the cross-flow gas-fired steam boiler is reduced by 50% in the same tonnage. In the cross-flow gas-fired steam boiler, the flue gas flows in an Omega type. Specifically, the high-temperature flue gas generated by combustion in the furnace enters an axisymmetric narrow flow channel formed by the inner tube bundle and the outer tube bundle through a narrow seam on a side of the furnace. In the tube bundle area close to the narrow seam, the flue gas has a high temperature, a high flow rate, and a large heat exchange capacity. In the tube bundle area close to the outlet, the flue gas has a low temperature, a low flow rate, and a small heat exchange capacity. Therefore, the thermal load is significantly uneven among different tube bundles. In the area where the heat exchange capacity is large, the water concentration rate of the furnace is large, which will cause fouling. As a consequence, a fouling inhibitor needs to be added for a long time to prevent boiler fouling. Moreover, the flow rate of the flue gas can reach more than 50 m/s when flowing between the tube bundles, the flue gas resistance can reach more than 5 kPa, the power of the fan of the burner is large, and the burner noise is huge.

Chinese Patent No. 205208916U discloses a central air-reversal boiler, which is a kind of WNS boiler. The central air-reversal boiler adopts a diffusion-type combustor. The fuel gas is combusted in the furnace and then enters a reversal chamber to turn into the gas tube for cooling. The flue gas flows in a two-backhaul or three-backhaul manner. The heat load of the heated surface of the WNS boiler is lower than that of the cross-flow boiler, and the WNS boiler has less fouling problem. In the WNS boiler, the highest flow rate of the flue gas is lower than 30 m/s, and the boiler resistance is generally less than 1000 Pa. However, the boiler is space-occupied, has a huge water volume, a slow start-stop speed, and a large heat loss.

SUMMARY

To overcome the above deficiencies in the prior art, the present disclosure provides a gas-fired steam boiler. A gap channel formed between the arc-typed fin and the circular tube can eliminate the central high-temperature region in the traditional heat exchange process. When the flue gas passes through the gap channel, the whole gap channel is in a boundary layer region with strong heat and mass transfer, where the heat exchange coefficient can reach 120 W (m$^2$/° C.). By adopting the central symmetrical and discrete design, the flue gas flows out of the furnace evenly through the gap channels distributed along the circumferential direction, ensuring that the heat load of all heat exchange tubes is evenly distributed and the flue gas resistance is less than 1000 Pa, so as to avoid strong evaporation of water and the precipitation of soluble salt caused by the large local heat load of the heat exchange tube, thereby reducing the risk of fouling caused by the precipitation of soluble salts, and also reducing the steel consumption, water volume, and electrostatic consumption of the gas-fired steam boiler.

Technical solutions of the present disclosure are described as follows.

This application provides gas-fired steam boiler, comprising:
  a plurality of heat exchange tubes;
  an upper steam header;
  a lower header;
  a casing;
  a burner;
  a condenser;
  a chimney; and
  a controller;
  wherein the gas-fired steam boiler is vertically arranged; the plurality of heat exchange tubes are vertically arranged to form an annular tube row; a space enclosed by the annular tube row is configured as a furnace; a gap channel is provided between adjacent two of the plurality of heat exchange tubes, and is evenly distributed along a circumferential direction; an upper end of each of the plurality of heat exchange tubes extends into the upper steam header, and a lower end of each of the plurality of heat exchange tubes extends into the lower header; the upper steam header and the lower header are both annular; a section of upper steam header coplanar with an axis of the gas-fired steam boiler is rectangular, circular, or triangular; a section of the lower header coplanar with the axis of the gas-fired steam boiler is rectangular, circular, or triangular; the upper steam header is provided with a steam outlet, a safety valve, a first water level gauge interface, a pressure gauge or pressure sensor interface, and a burner mounting panel; the lower header is provided with a first water inlet, a waste water outlet, a separator for separating the furnace from the condenser, and a second water level gauge interface; a top of the casing is connected to an outer edge of a bottom of the upper steam header; the casing is configured to surround the plurality of heat exchange tubes, the lower header and the condenser; natural gas and air are mixed uniformly in an inlet end of the burner and then enter the furnace from up to bottom to undergo combustion to generate flue gas; a first annular space is provided between the casing and the plurality of heat exchange tubes, and a second annular space is provided between the casing and the lower header; the first annular space and the second annular space are configured for flow of the flue gas; the burner is fixedly arranged on the burner mounting panel; the condenser is arranged below or at an outer side of the lower header, and is configured to condense the flue gas flowing from the second annular space; a bottom of the casing is provided with a condensate collecting plate; and the condensate collecting plate is located below the condenser; the chimney is located at an end of the condensate collecting plate, and is separated from an outer edge of the upper steam header;

the plurality of heat exchange tubes are finned circular tubes or tripodal shaped tubes the condenser is a coil condenser, a combined gap-type condenser, or a gap-type coil pipe condenser;

the burner is a diffusion burner or a full premix burner;

the flue gas generated by the combustion enters the gap channel under a co-constraint of the burner mounting panel and the separator; after being cooled in the gap channel, the flue gas passes through the first annular space and the second annular space in sequence to enter the condenser for cooling and condensation; the flue gas flowing out of the condenser enters the condensate collecting plate to allow condensed water to be collected and then flows upward to leave the gas-fired steam boiler through the chimney; boiler feed water enters the condenser to absorb residual heat of the flue gas, and then passes through the first water inlet to enter the lower header to be evenly distributed to the finned circular tubes; the boiler feed water absorbs heat and vaporizes into steam while flowing upward along the finned circular tubes; and the steam flows upward to the upper steam header to leave the gas-fired steam boiler from the steam outlet; and each of the finned circular tubes comprises a base tube and an arc-shaped fin; an inner diameter of the arc-shaped fin is greater than an outer diameter of the base tube; the gap channel is formed between the arc-shaped fin of one of adjacent two finned circular tubes and the base tube of the other of the adjacent two finned circular tubes, and a width of the gap channel is 0.1-4 mm; the arc-shaped fin is configured to fully, half, unilaterally or bilaterally enclose the base tube of an adjacent finned circular tubes; for each of the finned circular tubes, an outer circumference of the base tube intersects with, is tangent to, or is separated from a circle where an outer circumference of the arc-shaped fin is located; when the outer circumference of the base tube is separated from the circle where the outer circumference of the arc-shaped fin is located, a spacing therebetween is set to be less than 5 mm to ensure that there is enough fusion area between the based tube and the arc-shaped fin; for adjacent two finned circular tubes, an outer circumference of the base tube, a circle where an inner circumference of the arc-shaped fin of one finned circular tube is located is separated from an outer circumference of the base tube of the other finned circular tube to form the gap channel; the base tube is made of a material specified in a gas boiler standard, and the arc-shaped fin is not a pressure bearing, and is made of a material with a high thermal conductivity; an inner side of the arc-shaped fin is provided with triangular corrugation, sinusoidal corrugation, arc-tangent corrugation, or rectangular corrugation to expand a heat exchange area of the arc-shaped fin, disturb the flue gas, and enhance a heat exchanging effect; a first positioning sheet is spot-welded on a surface of the base tube, and a thickness of the first positioning sheet is equal to the width of the gap channel; an inner surface of the arc-shaped fin abuts against the first positioning sheet on the base tube of an adjacent finned circular tube to allow the width of the gap channel to reach a preset value; two ends of the base tube are respectively provided with a necking connector or necked down to forming a necking connector to enable welding when a distance between the adjacent two finned circular tubes is too small to be welded; and the necking connector is not connected to the arc-shaped fin, so as to facilitate welding between adjacent two finned circular tubes through the necking connector.

In an embodiment, the adjacent two finned circular tubes are arranged concentrically or eccentrically; when the adjacent two finned circular tubes are arranged concentrically, a central axis of the base tube of one of the adjacent two finned circular tubes coincides with a central axis of the arc-shaped fin of the other of the adjacent two finned circular tubes, and an angle formed by connecting lines between central axes of base tubes of sequentially-distributed three finned circular tubes is calculated by: $180°-(360°/n)$, wherein n represents the number of the finned circular tubes arranged along the circumferential direction; when the central axis of the base tube of one of the adjacent two finned circular tubes is not coincided with the central axis of the arc-shaped fin of the other of the adjacent two finned circular tubes; each of the finned circular tubes rotates towards the furnace by a preset angle around the central axis of the base tube such that an inlet of the gap channel is larger than an outlet of the gap channel to adapt to volume change of the flue gas during cooling; the finned circular tubes are uniformly arranged along the circumferential direction to form the annular tube row; and when a power of the gas-fired steam boiler is increased, two, three or four annular tube rows are arranged to enlarge the heat exchange area.

In an embodiment, when the base tube and the arc-shaped fin are both made of steel, the base tube and the arc-shaped fin are connected through narrow-gap double-side welding to ensure heat conduction between the base tube and the arc-shaped fin; and when the base tube is made of steel, and the arc-shaped fin is made of a thermally-conductive material, the base tube and the arc-shaped fin are connected by braze welding, and in this case, a contact length between the arc-shaped fin and the base tube is more than 4 mm.

In an embodiment, a welding fixture is adopted to enable precision positioning when the arc-shaped fin is welded with the base tube; the welding fixture comprises a groove and a convex; the groove is configured to accommodate the base tube, and the convex is configured to simulate a base tube adjacent to the base tube; during welding, the base tube is placed in the groove, and the arc-shaped fin is pressed on the convex to allow the base tube to be precisely welded with the arc-shaped fin through narrow-gap submerged arc welding.

In an embodiment, each of the finned circular tubes is prepared from a first circular tube and a second circular tube by welding and cutting, and the first circular tube is larger than the second circular tube in diameter; wherein the second circular tube is configured as the base tube, and the first circular tube is cut along a length direction to remove an arc section, so as to be configured as the arc-shaped fin; or each of the finned circular tube is prepared from one first circular tube and two second circular tubes by welding and cutting, wherein the one first circular tube is larger than the two second circular tubes in diameter; the two second circular tubes are arranged respectively at two sides of the one first circular tube, and after welded with the two second circular tubes, the one first circular tube is cut along a length direction to obtain two finned circular tubes.

In an embodiment, each of the tripodal shaped tubes is composed of an inner-circular base tube, a first fin arranged in an inner side of the furnace, and a second fin arranged in an outer side of the furnace. Each of the tripodal shaped tube is axisymmetric. A length of the first fin is less than 15 mm, and a length of the second fin is greater than the length of the first fin. The tripodal shaped tubes are arranged uniformly along the circumferential direction to form the vertical annular tube row. The cylindrical space surrounded by the annular tube row is configured as the furnace. An axial gap channel is formed between the first fin of one of adjacent two tripodal shaped tubes and the second fin of the other of the adjacent two tripodal shaped tubes. The flue gas flows along the gap channel and cools down after passing through the gap channel.

In an embodiment, the coil condenser comprises an isobaric air channel inlet, a coil pipe, and an isobaric air channel outlet; the isobaric air channel inlet is provided on a top of the coil condenser, and the isobaric air channel outlet is provided on a bottom of the coil condenser; an inlet of the coil pipe is provided at the bottom of the coil condenser, and an outlet of the coil pipe is provided at the top of the coil condenser; the coil pipe consists of multiple layers of bare tubes or spiral finned tubes coiled side by side; the flue gas flows from up to bottom to pass through the second annular space to enter the coil condenser from the isobaric air channel inlet and flow out of the coil condenser from the isobaric air channel outlet; the condensed water generated in the coil condenser flows into the condensate collecting plate arranged at the bottom of the casing; and the boiler feed water enters the coil condenser through the isobaric air channel inlet and flows out of the coil condenser from the outlet of the coil pipe.

In an embodiment, the combined gap-type condenser comprises an upper water chamber, a lower water chamber, the finned circular tubes arranged between the upper water chamber and the lower water chamber, an air channel inlet arranged on an outer side of the finned circular tubes, and an outlet plate arranged on a bottom of an inner side of the lower water chamber; the lower water chamber is provided with a second water inlet and a water outlet; a baffle plate is arranged in the upper water chamber and the lower water chamber to guide reciprocating flow of the boiler feed water along a vertical direction between the upper water chamber and the lower water chamber, so as to increase a flow rate of the boiler feed water inside the finned circular tubes and reduce sub-cooled boiling of the boiler feed water; the arc-shaped fin is configured to fully or bilaterally enclose the base tube of an adjacent finned circular tube to increase a length of the gap channel along a circumferential direction; and the flue passes through the second annular space to enter the air channel inlet and flow along the gap channel to enter a cavity formed by the finned circular tubes, and subsequently flows downward with the condensed water to pass through the outlet plate to enter the condensate collecting plate.

In an embodiment, the gap-type coil condenser comprises a circumferential inlet air channel, a multi-layered coiled finned tube arranged inside the circumferential inlet air channel, an outlet plate arranged at a bottom of the multi-layered coiled finned tube, and a plurality of positioning bolts configured to fix the separator and the outlet plate; the multi-layered coiled finned tube comprises a coiled base tube, a coiled fin, and a plurality of second positioning sheets spaced apart; the multi-layered coiled finned tube is prepared by bending a finned circular tube; an outer edge of the outlet plate fits an inner wall of the circumferential inlet air channel such that the outlet plate is capable of moving up and down along the inner wall of the circumferential inlet air channel; each of the plurality of positioning bolts is fixedly arranged on the separator of the lower header and passes through the outlet plate to fit with a nut arranged below the outlet plate; the nut is configured to be tightened to apply a compressive force such that the coiled fin of an upper layer of adjacent two layers of the multi-layered coiled finned tube contacts with the plurality of second positioning sheets on a lower layer of the adjacent two layers of the multi-layered coiled finned tube, and a gap therebetween is adjustable; a thickness of each of the plurality of second positioning sheets is equal to a width of the gap; when the multi-layered coiled finned tube needs to be cleaned, the nut is loosened to remove the outlet plate to take the multi-layered coiled finned tube out; the flue gas passes through the second annular space to enter the circumferential air inlet channel to be uniformly distributed into the gap formed between adjacent coiled fins of the multi-layered coiled finned tube, and subsequently flows with the condensed water to pass through the outlet plate to enter the condensate collecting plate; an inlet of the multi-layered coiled finned tube is provided on a bottom of the gap-type coil condenser, and an outlet of the multi-layered coiled finned tube is provided on a top of the gap-type coil condenser; and the boiler feed water enters the gap-type coil condenser from the inlet of the multi-layered coiled finned tube and flows out of the gap-type coil condenser from the outlet of the multi-layered coiled finned tube.

Compared to the prior art, the present disclosure has the following beneficial effects.

The gas-fired steam boiler provided herein eliminates the central high-temperature area during the heat exchange process of the flue gas through the gap channel, so that the boiler flue gas can be cooled from 1100° C. to below 300° C. by using the gap channel with a length of only 50-300 mm, and meanwhile, the flue gas resistance is controlled below 1000 Pa, and thereby reducing the steel consumption and the water volume of the boiler.

By using the gas-fired steam boiler provided herein, the flue gas can be evenly distributed to each gap channel. The gas-fired steam boiler is compatible with the mainstream diffusion-typed burner and metal fiber surface burner, to solve the problems, such as single-sided fuel gas exhaust, uneven heat load, fouling, and tube-burst, in the traditional cross-flow boiler furnace.

The condenser of the gas-fired steam boiler provided herein is arranged below or at a side of the lower header of the gas-fired steam boiler, which saves an occupied space for an external of the traditional gas-fired steam boiler. As a result, the occupied space of the gas-fired steam boiler provided herein can be reduced by 30-50% compared with the traditional gas-fired steam boiler.

Figure 1A:
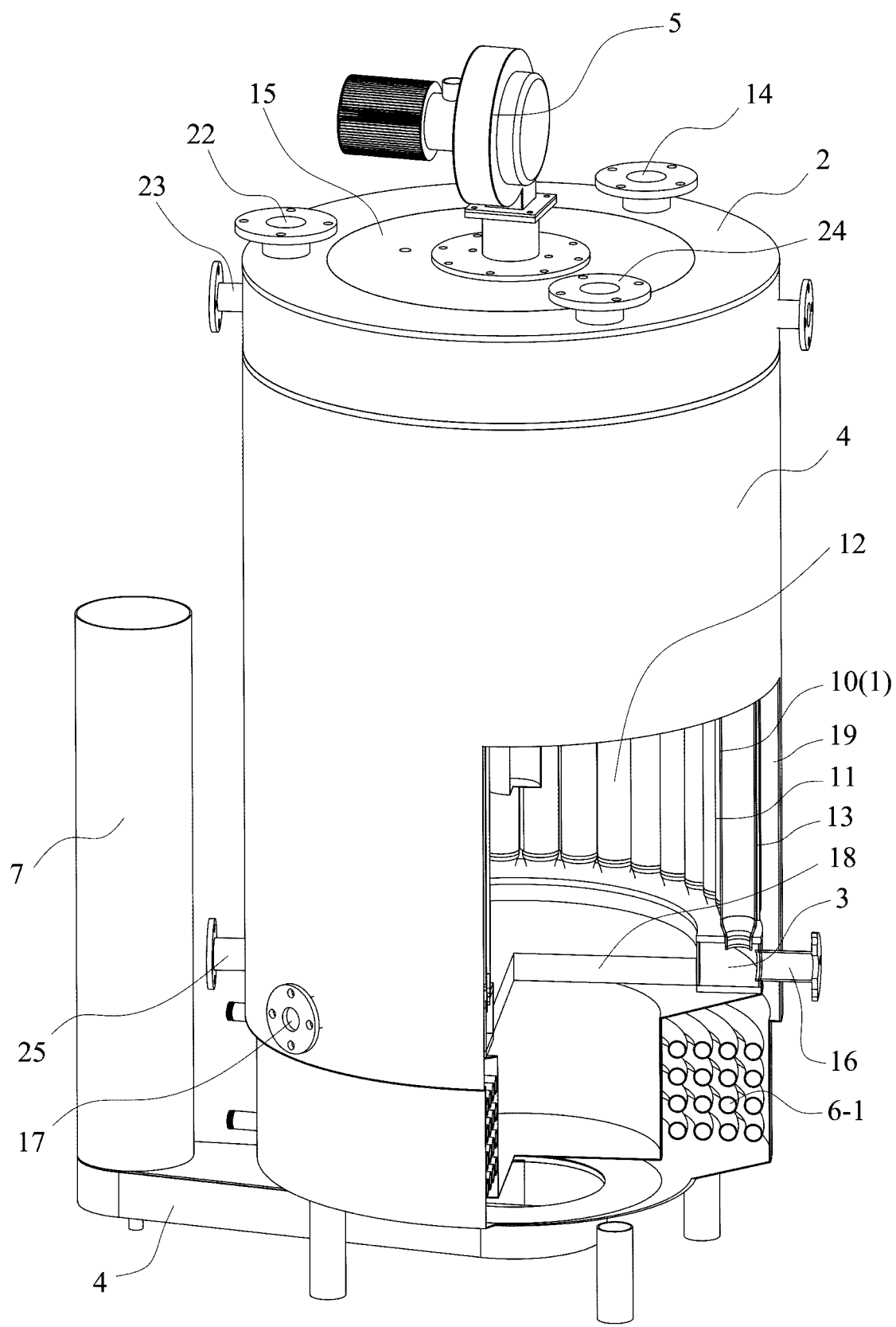
FIG. 1a schematically shows a structure of a gas-fired steam boiler when a condenser is arranged below a lower header of the gas-fired steam boiler according to Embodiment 1 of the present disclosure.

In the drawings, 1, finned circular tube; 1-1, base tube; 1-2, arc-shaped fin; 1-2-1, half-enclosed arc-shaped fin; 1-2-2, bilaterally-enclosed arc-shaped fin; 1-2-3, unilaterally-enclosed arc-shaped fin; 1-2-4, fully-enclosed arc-shaped fin; 1-3, first positioning sheet; 1-4, necking connector; 2, upper steam header; 3, lower header; 4, casing; 4-1 condensate collecting plate; 5, burner; 6, condenser; 6-1, coil condenser; 6-1-1, isobaric air channel inlet; 6-1-2, coil pipe; 6-1-3, isobaric air channel outlet; 6-1-4, inlet of the coil pipe; 6-1-5, outlet of the coil pipe; 6-2, combined gap-type condenser; 6-2-1, air channel inlet; 6-2-2, upper water chamber; 6-2-3, lower water chamber; 6-2-4, outlet plate; 6-2-5, second water inlet; 6-2-6, water outlet; 6-3, gap-type coil condenser; 6-3-1, circumferential air inlet channel; 6-3-2, multi-layered coiled finned tube; 6-3-2-1, coiled base tube; 6-3-2-2, coiled fin; 6-3-2-3, second positioning sheet; 6-3-3, outlet plate; 6-3-4, positioning bolt; 6-3-5, inlet of the coil pipe; 6-3-6, outlet of the coil pipe; 6-3-7, nut; 7, chimney; 8, welding fixture; 8-1, groove; 8-2, convex; 9, tripodal shaped tube; 9-1, inner-circular base tube; 9-2, first fin; 9-3, second fin; 10, heat exchange tube; 11, annular tube row; 12, furnace; 13, gap channel; 14, steam outlet; 15, burner mounting panel; 16, first water inlet; 17, waste water outlet; 18, separator; 19, first annular space; 20, second annular space; 21, corrugation; 22, safety valve; 23, first water level gauge interface; 24, pressure gauge or pressure sensor interface; and 25, second water level gauge interface.

DETAILED DESCRIPTION OF EMBODIMENTS

The disclosure will be described in detail below with reference to accompanying drawings and embodiments.

As shown in FIG. 1, a gas-fired steam boiler is provided in an embodiment, which includes a plurality of heat exchange tubes 10, an upper steam header 2, a lower header 3, a casing 4, a burner 5, a condenser 6, and a chimney 7. The gas-fired steam boiler is arranged vertically. The plurality of heat exchange tubes 10 are vertically arranged to form an annular tube row 11. A space enclosed by the annular tube row 11 is configured as a furnace 12. A gap channel 13 is provided between adjacent two of the plurality of heat exchange tubes 10, and is uniformly distributed along a circumferential direction. An upper end of each of the plurality of heat exchange tubes 10 extends into the upper steam header 2, and a lower end of each of the plurality of heat exchange tubes 10 extends into the lower header 3. The upper steam header 2 and the lower header 3 are both annular. A section of the upper steam header 2 coplanar with an axis of the gas-fired steam boiler is rectangular, circular, or triangular. A section of the lower header 3 coplanar with the axis of the gas-fired steam boiler is rectangular, circular, or triangular. The upper steam header 2 is provided with a steam outlet 14, a safety valve 22, a first water level gauge interface 23, a pressure gauge or pressure sensor interface 24, and a burner mounting panel 15. The lower header 3 is provided with a water inlet 16, a waste water outlet 17, a separator 18 for separating the furnace from the condenser, and a second water level gauge interface 25. A top of the casing 4 is connected to an outer edge of a bottom of the upper steam header 2. The casing is configured to surround the plurality of heat exchange tubes 10, the lower header 2, and the condenser 6. Natural gas and air are mixed uniformly in a front end of the burner 5 and then enter the furnace 12 from up to bottom to undergo combustion to generate flue gas. A first annular space 19 is provided between the casing 4 and the plurality of heat exchange tubes 10, and a second annular space 20 is provided between the casing 4 and the lower header 3. The first annular space 19 and the second annular space 20 are configured for flow of flue gas. The burner 5 is fixedly arranged on the burner mounting panel 15. The condenser 6 is arranged below or an outer side the lower header 3, and is configured to condense the flue gas flowing from the second annular space. A bottom of the casing 4 is provided with a condensate collecting plate 4-1. The condensate collecting plate 4-1 is located below the condenser 6. The chimney 7 is located at an end of the condensate collecting plate 4-1, and is separated from an outer edge of the upper steam header 2. The plurality of heat exchange tubes 10 are finned circular tubes 1 or tripodal shaped tubes 9. The condenser 6 is a coil pipe condenser 6-1, a combined gap-type condenser 6-2, or a gap-type coil condenser 6-3. The burner 5 is a diffusion burner or a full premix burner.

In an embodiment, the number of the plurality of heat exchange tubes 10 is more than 10.

In an embodiment, the waste water outlet 17 is configured to drain water sewage in the lower header 3.

In an embodiment, the flue gas contains water vapor, during the condensation in the condenser 6, the steam in the flue gas is condensed to generate condensed water, and the flue gas flows upward to enter the chimney 7 and then leave the gas-fired steam boiler through the chimney 7.

In an embodiment, as shown in FIG. 1a, the condenser is arranged below the lower header and is configured to condense flue gas flowing from the second annular space 20. Specifically, the flue gas in the second annular space 20 flows downwards to the condenser 6. The flue gas flowing out of the condenser 6 enters the condensate collecting plate 4-1 to allow condensed water to be collected and then flows upward to be gathered at the chimney 7.

Figure 1B:
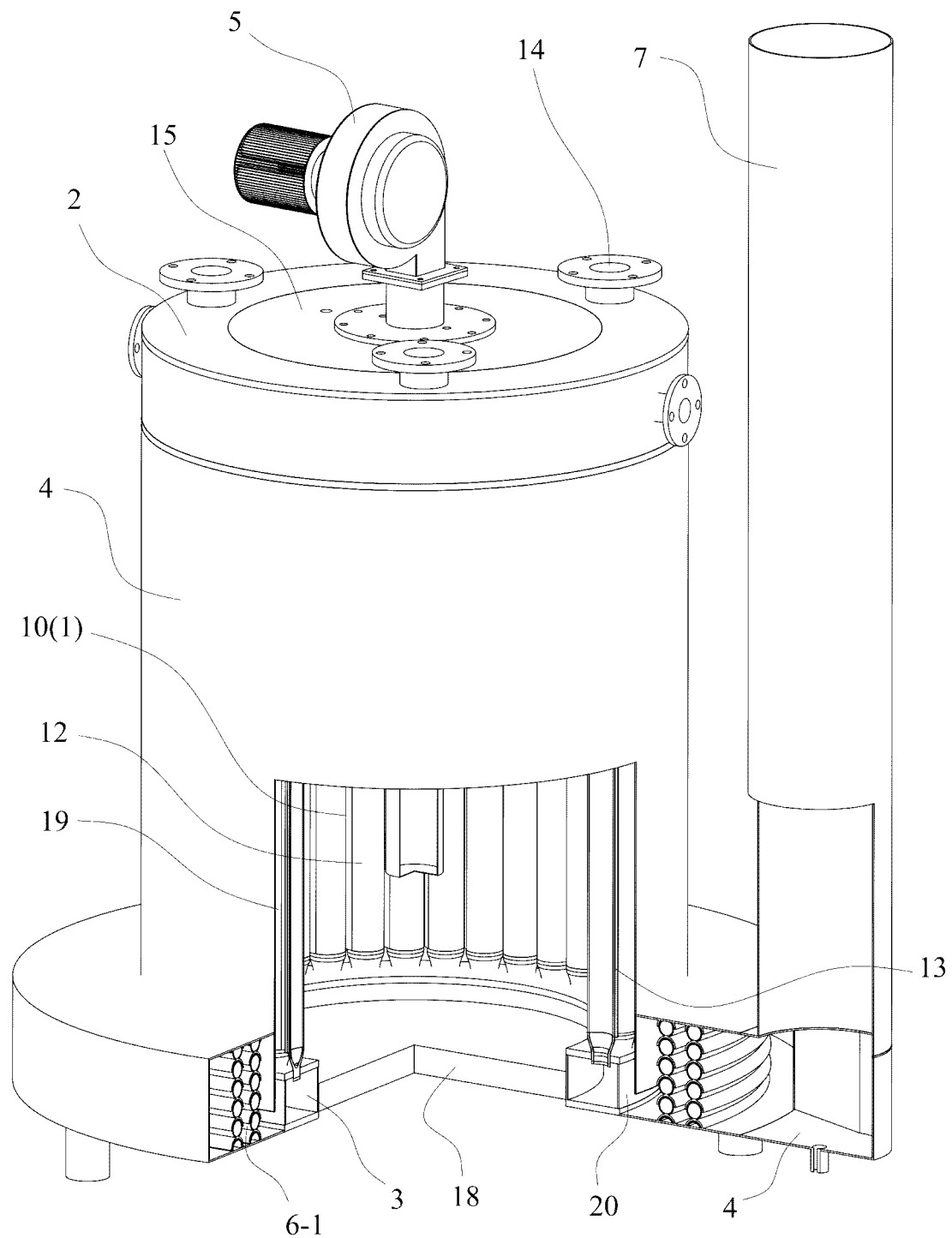
FIG. 1b schematically shows a structure of the gas-fired steam boiler when the condenser is arranged at a side of the lower header of the gas-fired steam boiler according to an embodiment of the present disclosure.

In an embodiment, as shown in FIG. 1b, the condenser 6 is arranged in an outer side the lower header 3 and is configured to condense flue gas flowing from the second annular space 20. Specifically, the flue gas in the second annular space 20 flows into the condenser 6 from a side of the condenser 6. The flue gas flowing out of the condenser 6 enters the condensate collecting plate 4-1 to allow condensed water to be collected and then flows upward to be gathered at the chimney 7.

The flue gas generated in the burner 12 enters the gap channel 13 under a co-constraint of the burner mounting panel 5 and the separator 18. After being cooled in the gap channel 13, the flue gas passes through the first annular space 19 and the second annular space 20 in sequence to enter the condenser 6 for cooling and condensation. The flue gas flowing out of the condenser enters the condensate collecting plate 4-1 to allow condensed water to be collected and then flows upward to leave the gas-fired steam boiler through the chimney 7. Boiler feed water enters the condenser 6 to absorb residual heat of the flue gas, and then passes through the water inlet 16 to enter the lower header 3 to be evenly distributed to the finned circular tubes 1. The boiler feed water absorbs heat and vaporizes into steam while flowing upward along the finned circular tubes 1. Then the steam flows upward to the upper steam header 2 to leave the gas-fired steam boiler from the steam outlet 14.

In an embodiment, the plurality of heat exchange tubes 10 are uniformly distributed along the circumferential direction to form the vertically arranged annular tube row 11.

Figure 2A:
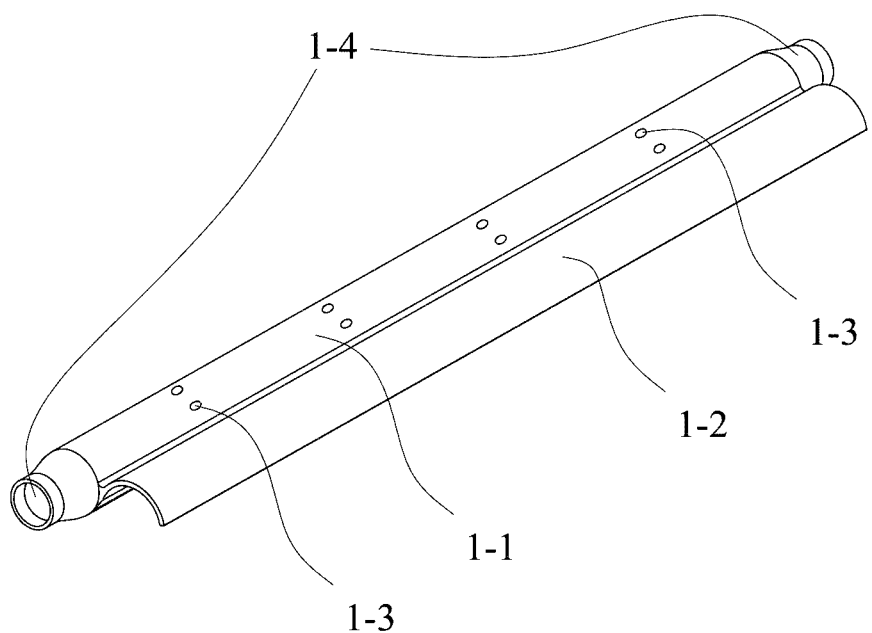
FIG. 2a schematically shows a structure of a finned circular tube according to an embodiment of the present disclosure.

As shown in FIG. 2a, a finned circular tube 1 includes a base tube 1-1, an arc-shaped fin 1-2, an first positioning sheet 1-3, and a necking connector 1-4. An inner circumferential diameter of the arc-shaped fin 1-2 is greater than an outer circumferential diameter of the base tube 1-1. The gap channel 13 is formed between the arc-shaped fin 1-2 of one of adjacent two finned circular tubes 1 and the base tube 1-1 of the other of the adjacent two finned circular tubes 1, and a width of the gap channel is 0.1-4 mm. The arc-shaped fin 1-2 is configured to fully, half, unilaterally or bilaterally enclose the base tube 1-1 of an adjacent finned circular tube 1. An outer circumference of the base tube 1-1 intersects with, is tangent to, or is separated from a circle where an outer circumference of the arc-shaped fin 1-2 is located. When the outer circumference of the base tube is separated from the circle where the outer circumference of the arc-shaped fin is located, a spacing therebetween is set to be less than 5 mm to ensure that there is enough fusion area between the based tube and the arc-shaped fin. A circle where an inner circumference of the arc-shaped fin 1-2 of one finned circular tube is located is separated from an outer circumference of the base tube 1-1 of the other finned circular tube to form the gap channel. An inner side of the arc-shaped fin 1-2 is provided with corrugation 21, where the corrugation 21 is triangular, sinusoidal, arc-tangent, or rectangular, to expand a heat exchange area of the arc-shaped fin, disturb the flue gas, and enhance a heat exchanging effect. A first positioning sheet 1-3 is spot-welded on a surface of the base tube 1-1, and a thickness of the first positioning sheet 1-3 is equal to the width of the gap channel 13. A first positioning sheet 1-3 is spot-welded on a surface of the base tube 1-1, and a thickness of the first positioning sheet is equal to the width of the gap channel 13. An inner surface of the arc-shaped fin 1-2 abuts against the first positioning sheet 1-3 on the base tube of an adjacent finned circular tube to allow the width of the gap channel 13 to reach a preset value. Two ends of the base tube 1-1 are respectively welded with a necking connector 1-4 or necked down to form a necking connector 1-4 to enable welding when a distance between adjacent two finned circular tubes is too small to be welded, and the necking connector is not connected to the arc-shaped fin. The necking connector 1-4 is not connected to the arc-shaped fin 1-2, so as to facilitate welding between adjacent two finned circular tubes 1 through the necking connector 1-4.

In an embodiment, a length of the gap channel 13 is 50-300 mm, and a height of the gap channel is the same as that of the plurality of heat exchange tubes 10.

In an embodiment, the base tube 1-1 is made of a material specified in a gas boiler standard, and the arc-shaped fin 1-2 is not a pressure bearing.

In an embodiment, the arc-shaped fin 1-2 is made of a material with a high thermal conductivity.

The finned circular tube 1, as a core heat exchange element in the gas-fired steam boiler of this application, is simple in structure and adjustable in gap channel, can be applied to a variety of gas-fired steam boilers with a capacity of 0.1-20 t, and is easy to large-scale production and assembly.

Figure 2B:
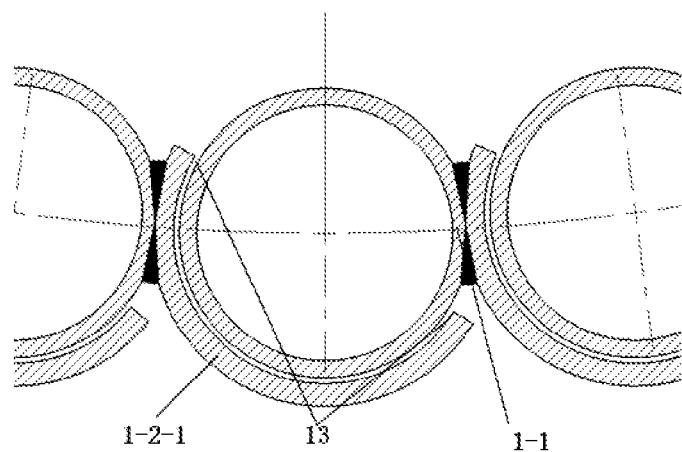
FIG. 2b schematically shows that an arc-shaped fin half encloses a base tube of an adjacent finned circular tube according to an embodiment of the present disclosure.
Figure 2C:
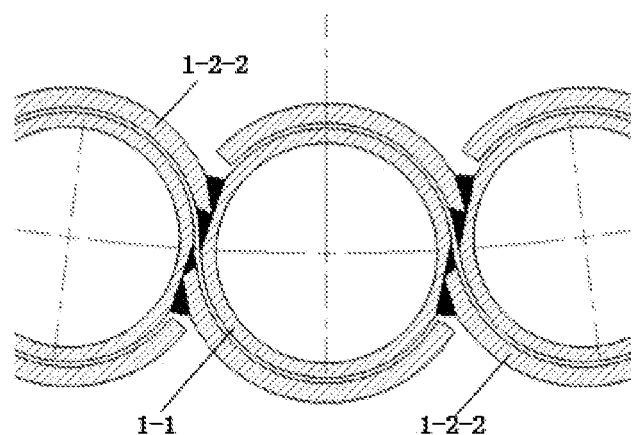
FIG. 2c schematically shows that an arc-shaped fin bilaterally encloses a base tube of an adjacent two finned circular tube according to an embodiment of the present disclosure.
Figure 2D:
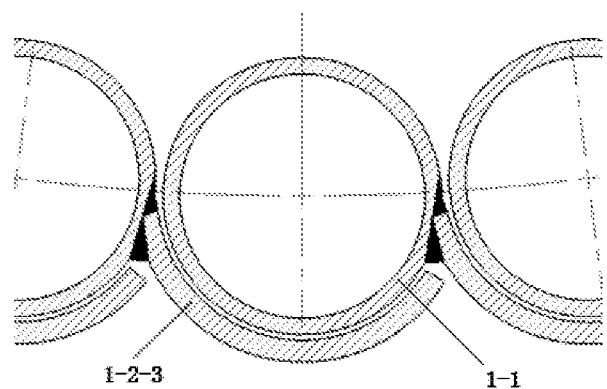
FIG. 2d schematically shows that the arc-shaped fin unilaterally encloses a base tube of an adjacent finned circular tube according to an embodiment of the present disclosure.
Figure 2E:
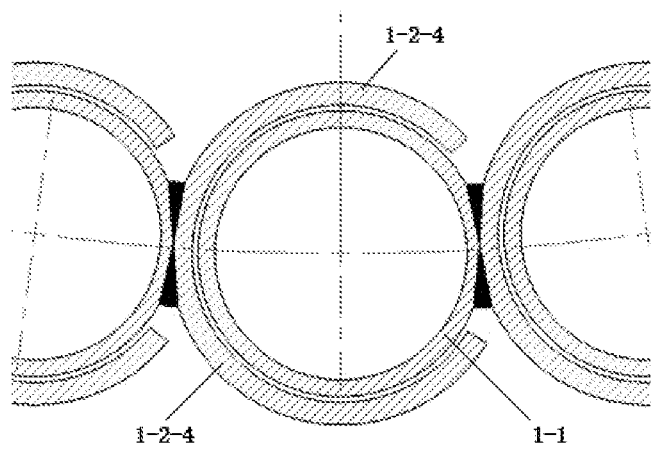
FIG. 2e schematically shows that an arc-shaped fin fully encloses a base tube of an adjacent finned circular tube according to an embodiment of the present disclosure.
Figure 2F:
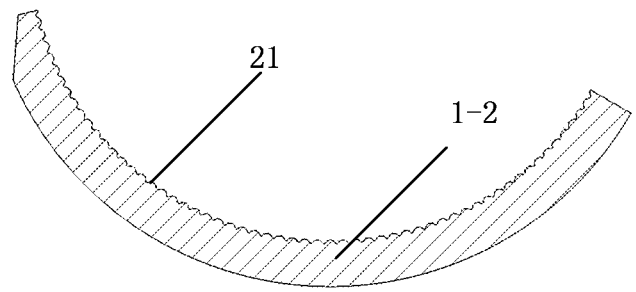
FIG. 2f schematically shows a structure of corrugation of an inner surface of the arc-shaped fin according to an embodiment of the present disclosure.

As shown in FIG. 2b, when the arc-shaped fin 1-2 half encloses the base tube 1-1 of an adjacent finned circular tube 1, the arc-shaped fin 1-2 is denoted as a half-enclosed arc-shaped fin 1-2-1. An outer circumference of the base tube 1-1 is tangent to a circle where an outer circumference of the half-enclosed arc-shaped fin 1-2-1 is located, and the base tube 1-1 and the semi-covered arc-shaped fin 1-2-1 are connected through double-side welding. As shown in FIG. 2c, when the arc-shaped fin 1-2 bilaterally encloses the base tube 1-1 of an adjacent finned circular tube 1, the arc-shaped fin 1-2 is denoted as a bilaterally-enclosed arc-shaped fin 1-2-2. An outer circumference of the base tube 1-1 intersects with a circle where an outer circumference of the bilateral-enclosed arc-shaped fin 1-2-2 is located, and the base tube 1-1 and the bilateral-enclosed arc-shaped fin 1-2-2 are connected through double-side welding. As shown in FIG. 2d, when the arc-shaped fin 1-2 unilaterally encloses the base tube 1-1 of an adjacent finned circular tube 1, the arc-shaped fin 1-2 is denoted as an unilaterally-enclosed arc-shaped fin 1-2-3. An outer circumference of the base tube 1-1 intersects with a circle where an outer circumference of the unilaterally-enclosed arc-shaped fin 1-2-3 is located, and the base tube 1-1 and the unilaterally-enclosed arc-shaped fin 1-2-3 are connected through double-side welding. As shown in FIG. 2e, when the when the arc-shaped fin 1-2 full encloses the base tube 1-1 of an adjacent finned circular tube 1, the arc-shaped fin 1-2 is denoted as a full-enclosed arc-shaped fin 1-2-4. An outer circumference of the base tube 1-1 is tangent to a circle where an outer circumference of the fully-enclosed arc-shaped fin 1-2-4 is located, and the base tube 1-1 and the fully-enclosed arc-shaped fin 1-2-4 are connected through double-side welding. FIG. 2f schematically shows a corrugation 21 of an inner surface of the arc-shaped fin 1-2. The corrugation 21 is configured to disturb the flue gas, expand a heat exchange area of the arc-shaped fin 1-2, and enhance a heat exchanging effect.

Figure 3A:
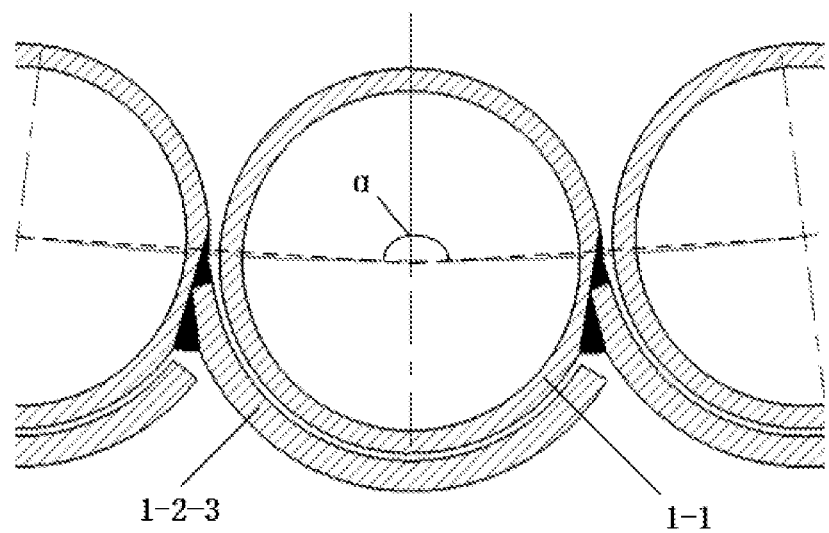
FIG. 3a schematically shows that the adjacent two finned circular tubes are connected concentrically according to an embodiment of the present disclosure.
Figure 3B:
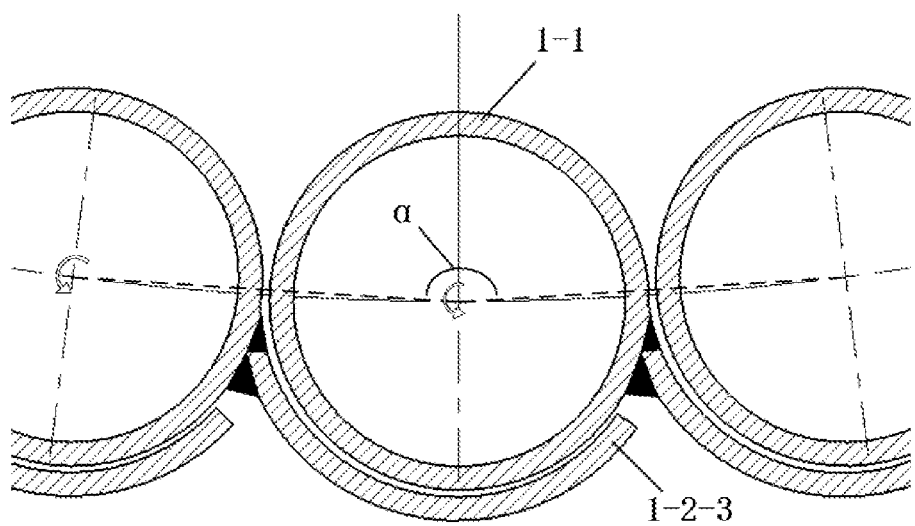
FIG. 3b schematically shows that the adjacent two finned circular tubes are connected eccentrically according to an embodiment of the present disclosure.

As shown in FIG. 3, the adjacent two finned circular tubes 1 are arranged concentrically or eccentrically. As shown in FIG. 3a, when the adjacent two finned circular tubes 1 are arranged concentrically, a central axis of the base tube 1-1 of one of the adjacent two finned circular tubes 1 coincides with a central axis of the arc-shaped fin 1-2 of the other of the adjacent two finned circular tubes 1, and an angle formed by connecting lines between central axes of base tubes 1-1 of sequentially-distributed three finned circular tubes 1 is calculated by: 180°−(360°/n), where n represents the number of the finned circular tubes arranged along the circumferential direction. As shown in FIG. 3b, when the central axis of the base tube 1-1 of one of the adjacent two finned circular tubes 1 is not coincided with the central axis of the arc-shaped fin 1-2 of the other of the adjacent two finned circular tubes. Each of the finned circular tube 1 rotates towards the furnace 12 by a preset angel around the central axis of the base tube 1-1 of the finned circular tube 1 such that an inlet of the gap channel 13 is larger than an outlet of the gap channel 13 to adapt to a volume change of the flue gas during cooling. The finned circular tubes 1 are uniformly arranged along the circumferential direction to form the annular tube row 11. When a power of the gas-fired steam boiler is increased, two, three or four annular tube rows 11 are arranged to enlarge the heat exchange area. Specifically, as shown in FIG. 3b, since the central axis of the base tube 1-1 of one of the adjacent two finned circular tubes 1 is not coincided with that of the arc-shaped fin 1-2 of the other of the adjacent two finned circular tubes 1, when the finned circular tube 1 rotates towards the furnace 12 around the central axis of the base tube 1-1 the finned circular tube, the finned circular tube 1 will be close to the base tube 1-1 of the adjacent finned circular tube 1, so that the spacing between the finned circular tube 1 and the base tube 1-1 of the adjacent finned circular tube 1 is reduced, but the spacing reduction at the inlet of the gap channel 13 (the inlet end of the flue gas) is smaller than that at the outlet of the gap channel 13 (the outlet end of the flue gas) such that the inlet of the gap channel 13 is larger than the outlet of the gap channel 13. The volume of the flue gas continues to decline during the cooling process, after the finned circular tube 1 rotates toward the furnace 12 around a central axis of the base tube 1-1 the finned circular tube, the flow rate of the flue gas can be always maintained at a high value, thereby enhancing the heat exchange effect between the flue gas and the finned circular tube 1.

In an embodiment, the finned circular tubes 1 are uniformly arranged along the circumferential direction to form the annular tube row 11. When a power of the gas-fired steam boiler is increased, a multi-circle annular tube row is used to enlarge the heat exchange area. In some embodiments, the diameters of the finned circular tubes in the multi-circle annular tube row 11 are different, and the finned circular tubes in the multi-circle annular tube row 11 are coaxial. The multi-circle annular tube row 11 may be two, three or four circles of the annular tube row 11.

When the base tube 1-1 and the arc-shaped fin 1-2 are both made of steel, the base tube 1-1 and the arc-shaped fin 1-2 are connected through narrow-gap double-side welding to ensure a good heat conduction between the base tube 1-1 and the arc-shaped fin 1-2. When the base tube 1-1 is made of steel, and the arc-shaped fin 1-2 is made of a thermally-conductive material, the base tube 1-1 and the arc-shaped fin 1-2 are connected by braze welding, and in this case, a contact length between the arc-shaped fin 1-2 and the base tube 1-1 is more than 4 mm.

Figure 4:
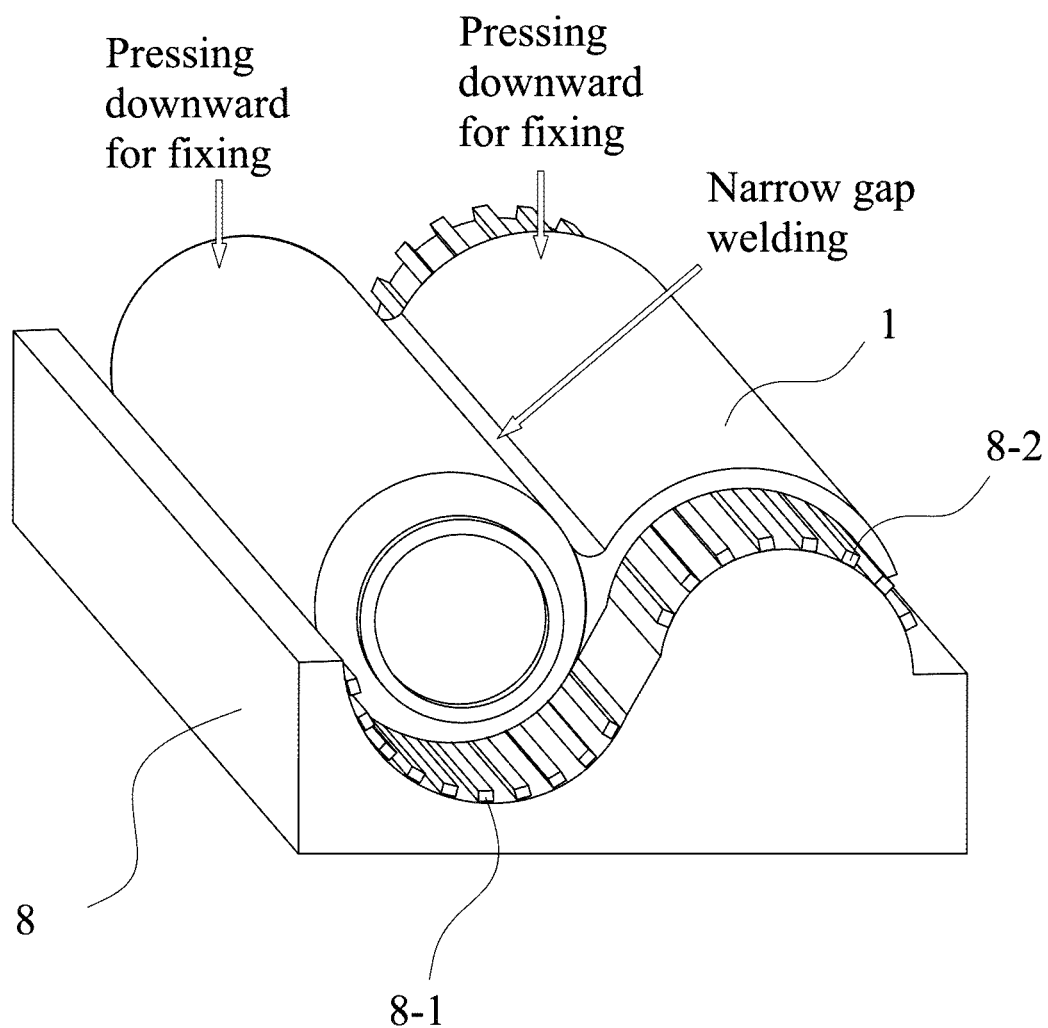
FIG. 4 schematically shows a welding between the arc-shaped fin and the base tube by using a welding fixture according to an embodiment of the present disclosure.

As shown in FIG. 4, the gas-fired steam boiler provided herein also includes a welding fixture 8, which is configured for precision positioning when the base tube 1-1 is welded with the arc-shaped fin 1-2. The welding fixture 8 includes a groove 8-1 and a convex 8-2. The groove 8-1 is configured to accommodate the base tube 1-1, and the convex 8-2 is configured to simulate a base tube 1-1 adjacent to the base tube. During welding, the base tube 1-1 is placed in the groove, and the arc-shaped fin 1-2 is pressed on the convex to allow the base tube 1-1 to be precisely welded with the arc-shaped fin 1-2 through narrow-gap submerged arc welding. Specifically, a large scaled production of the finned circular tube 1 is realized by narrow-gap submerged arc welding.

In an embodiment, each of the finned circular tubes 1 is prepared from a first circular tube and a second circular tube by welding and cutting, and the first circular tube is larger than the second circular tube in diameter, where the second circular tube is configured as the base tube 1-1, and the first circular tube is cut along a length direction to remove an arc section, so as to be configured as the arc-shaped fin 1-2. Or each of the finned circular tubes 1 is prepared from one first circular tube and two second circular tubes by welding and cutting, where the one first circular tube is larger than the two second circular tubes in diameter; the two second circular tubes are arranged respectively at two sides of the one first circular tube 1-1, and after welded with the two second circular tubes, the one first circular tube is cut along a length direction to obtain two finned circular tubes 1-2.

Figure 5A:
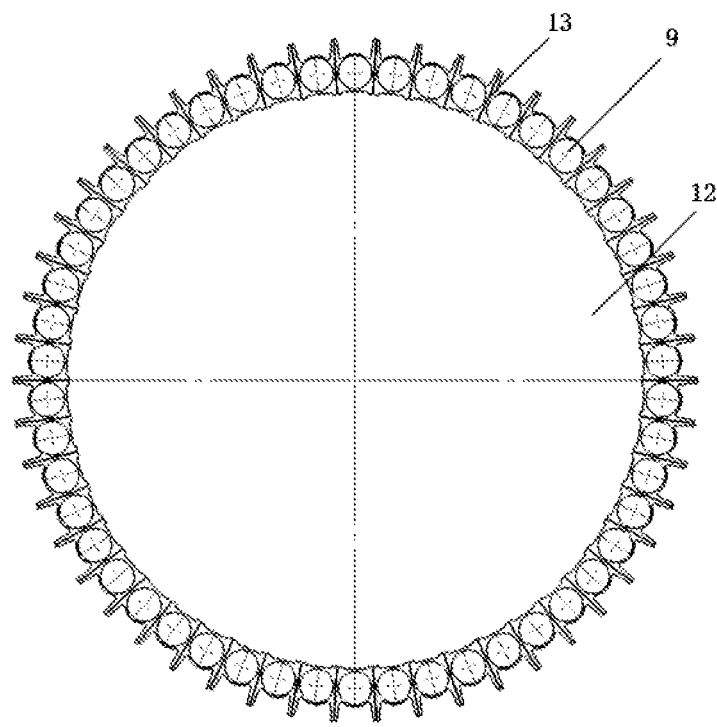
FIG. 5a schematically shows a structure of an annular tube row formed by a plurality of tripodal shaped tubes according to an embodiment of the present disclosure.
Figure 5B:
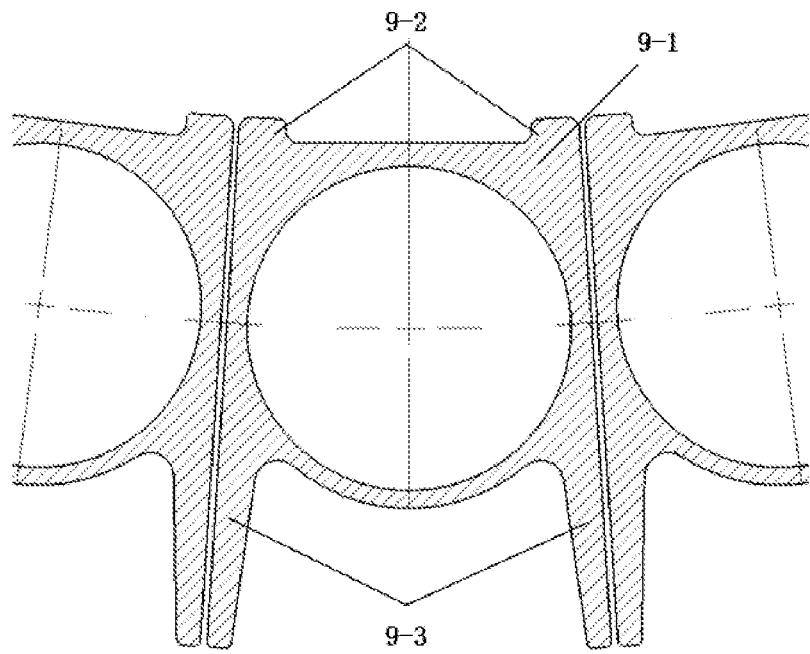
FIG. 5b schematically shows a cross-section of the plurality of tripodal shaped tubes according to an embodiment of the present disclosure.

As shown in FIG. 5a, the plurality of heat exchange tubes are tripodal shaped tubes 9. The gap channel is formed between adjacent two tripodal shaped tubes 9. As shown in FIG. 5b, the tripodal shaped tube 9 is composed of an inner-circular base tube 9-1, a first fin 9-2 arranged in an inner side of the furnace, and a second fin 9-3 arranged in an outer side of the furnace. The tripodal shaped tube is axisymmetric. A length of the first fin 9-2 is less than 15 mm, and a length of the second fin 9-3 is greater than the length of the first fin 9-2. The tripodal shaped tubes 9 are arranged uniformly along the circumferential direction to form the vertical annular tube row 11. The cylindrical space surrounded by the annular tube row 11 is configured as the furnace 12. An axial gap channel 13 is formed between the first fin 9-2 of one of adjacent two tripodal shaped tubes and the second fin 9-3 of the other of the adjacent two tripodal shaped tubes. The flue gas flows along the gap channel 13 and cools down after passing through the gap channel 13.

Figure 6:
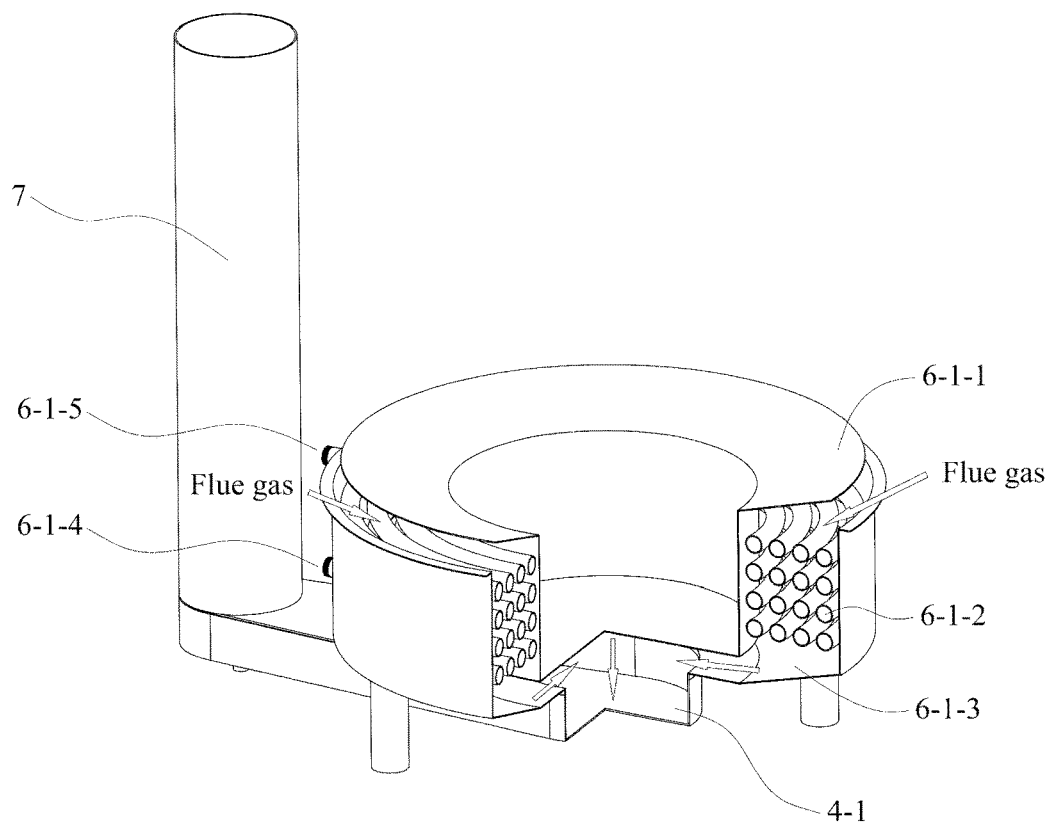
FIG. 6 is a partial sectional view of a coil condenser of the gas-fired steam boiler according to an embodiment of the present disclosure.

As shown in FIG. 6, the condenser 6 provided in an embodiment is a coil condenser 6-1, which includes an isobaric air channel inlet 6-1-1, a coil pipe 6-1-2, and an isobaric air channel outlet 6-1-3. The coil pipe 6-1-2 consists of multiple layers of bare tubes or spiral finned tubes coiled side by side. A bottom of the coil condenser 6-1 is provided with an inlet 6-1-4 of the coil pipe, and a top of the coil condenser 6-1 is provided with an outlet 6-1-5 of the coil pipe. The flue gas flows from up to bottom to pass through the second annular space 20 to enter the coil condenser 6-1 from the isobaric air channel inlet 6-1-1 and flow out of the coil condenser 6-1 from the isobaric air channel outlet 6-1-3. The condensed water generated in the coil condenser 6-1 flows into the condensate collecting plate 4-1 arranged at the bottom of the casing 4. The boiler feed water enters the coil condenser 6-1 through the inlet 6-1-4 of the coil pipe and flow out of the coil condenser 6-1 through the outlet 6-1-5 of the coil pipe. The flow direction of the boiler water is opposite to that of the flue gas such that the boiler water can exchange heat with the flue gas.

Figure 7:
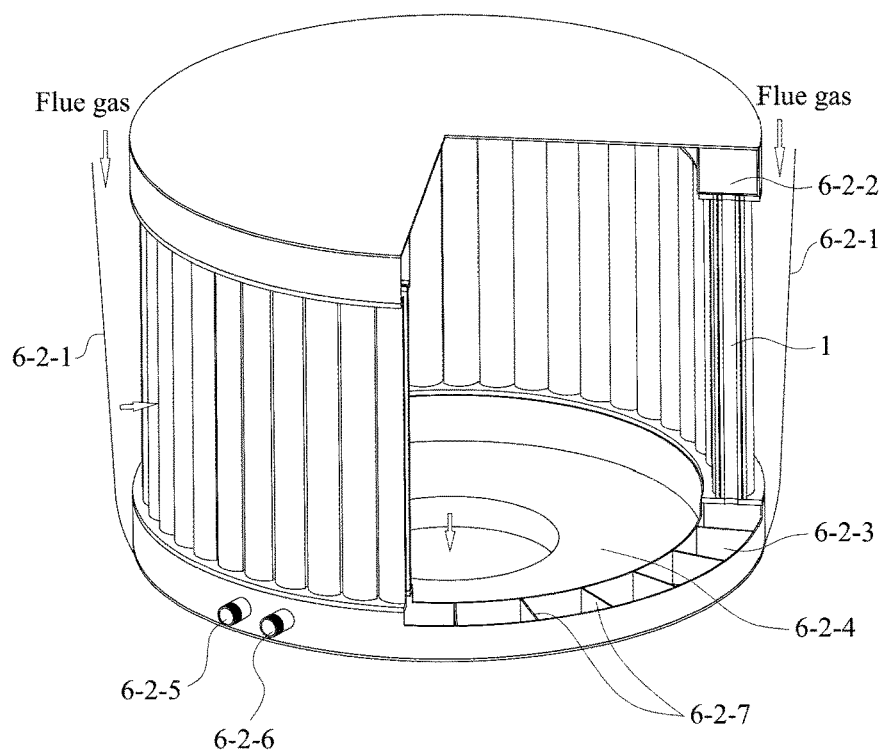
FIG. 7 is a partial sectional view of a combined gap-type condenser of the gas-fired steam boiler according to an embodiment of the present disclosure.

As shown in FIG. 7, the condenser 6 provided in an embodiment is a combined gap-type condenser 6-2, which includes an upper water chamber 6-2-2, a lower water chamber 6-2-3, the finned circular tubes 1 arranged between the upper water chamber 6-2-2 and the lower water chamber 6-2-3, an air channel inlet 6-2-1 arranged on an outer side of the finned circular tubes 1, and an outlet plate 6-2-4 arranged on a bottom of an inner side of the lower water chamber 6-2-3. The lower water chamber 6-2-3 is provided with a second water inlet 6-2-5 and a water outlet 6-2-6. A baffle plate 6-2-7 is arranged between the upper water chamber 6-2-2 and the lower water chamber 6-2-3, and is configured to guide reciprocating flow of the boiler feed water along a vertical direction between the upper water chamber 6-2-2 and the lower water chamber 6-2-3, so as to increase a flow rate of the boiler feed water inside the finned circular tube 1 and reduce sub-cooled boiling of the boiler feed water. The arc-shaped fin 1-2 fully or bilaterally encloses the base tube 1-1 of an adjacent finned circular tube 1 to increase a length of the gap channel along a circumferential direction. The flue gas passes through the second annular space 20 to enter the air channel inlet 6-2-1 and flow along the gap channel to enter a cavity formed by the finned circular tubes, and subsequently flows downward with the condensed water to pass through the outlet plate 6-2-4 to enter the condensate collecting plate 4-1 arranged at the bottom of the casing 4. When the combined gap-type condenser 6-2 is used in a heat-conducting oil boiler, the arc-shaped fin 1-2 half or unilaterally encloses the base tube 1-1 of an adjacent finned circular tube 1.

The combined gap-type condenser 6-2 provided herein can also be used for the furnace of the heat-conducting oil boiler. By using laminar flow strengthening instead of the traditional lateral scouring in the pipeline bundle to exchange heat, the heat transfer coefficient can be increased by more than 30%. In addition, compared with the traditional coil heat conduction oil boiler, the volume can be reduced by more than 30%, and steel consumption can be decreased by more than 30% by using the combined gap-type condenser 6-2.

Figure 8A:
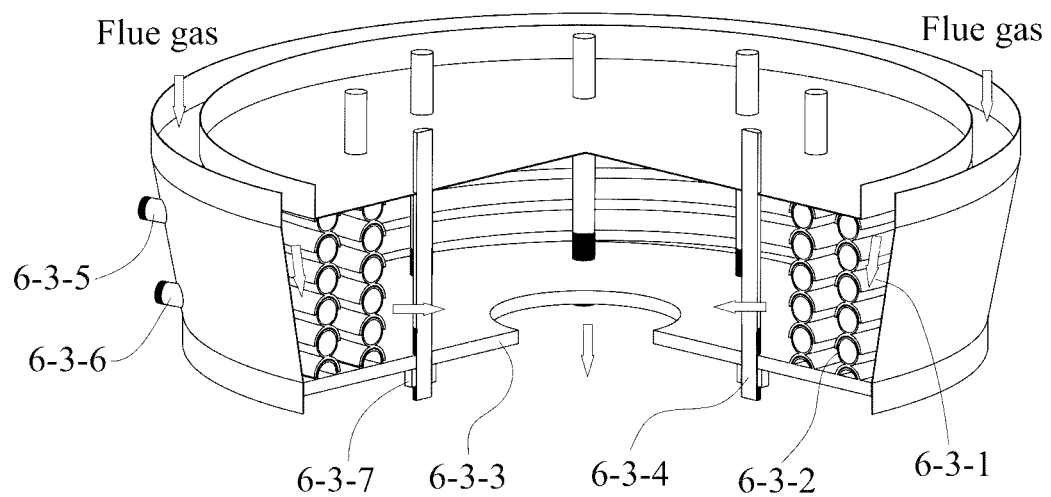
FIG. 8a is a partial sectional view of a gap-type coil condenser of the gas-fired steam boiler according to an embodiment of the present disclosure.
Figure 8B:
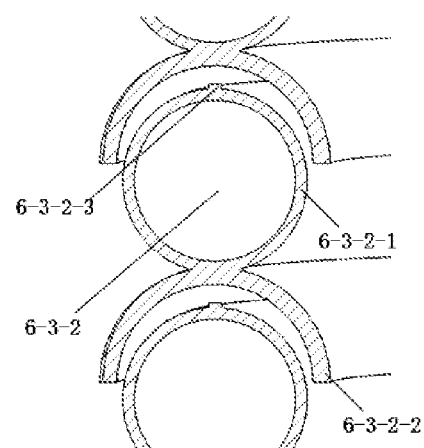
FIG. 8b is a sectional view of a multi-layered coiled finned tube at a non-stressed state according to an embodiment of the present disclosure.
Figure 8C:
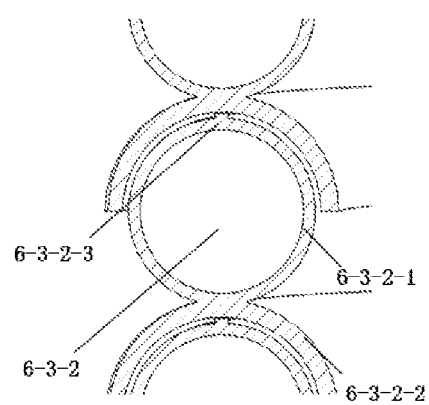
FIG. 8c schematically shows a sectional view of the multi-layered coiled finned tube at a stressed state according to an embodiment of the present disclosure.

As shown in FIG. 8, the condenser 6 provided in an embodiment is a gap-type coil condenser 6-3, which includes a circumferential air inlet channel 6-3-1, a multi-layered coiled finned tube 6-3-2 arranged inside the circumferential air inlet channel 6-3-1, an outlet plate 6-3-3 arranged at a bottom of the multi-layered coiled finned tube 6-3-2, and a plurality of positioning bolts 6-3-4 configured to fix the separator 18 and the outlet plate 6-3-3. An outer edge of the outlet plate 6-3-3 fits an inner wall of the circumferential air inlet channel 6-3-1 such that the outlet plate 6-3-3 is capable of moving up and down along the inner wall of the circumferential air inlet channel 6-3-1. Each of the plurality of positioning bolts 6-3-4 is fixedly arranged on the separator 18 of the lower header 3 and passes through the outlet plate 6-3-3 to fit with a nut arranged below the outlet plate 6-3-3 to position the outlet plate 6-3-3. The flue gas passes through the second annular space 20 to enter the circumferential air inlet channel 6-3-1 to be uniformly distributed into the gap channel 13, and subsequently flows with the condensed water to pass through the outlet plate 6-3-3 to enter the condensate collecting plate 4-1 arranged at the bottom of the casing 4. As shown in FIG. 8b, the multi-layered coiled finned tube includes a coiled base tube 6-3-2-1, a coiled fin 6-3-2-2, and a plurality of second positioning sheets 6-3-2-3 spaced apart. As shown in FIG. 8c, the multi-layered coiled finned tube 6-3-2 is prepared by bending a finned circular tube, a gap is formed between coiled fins at adjacent two layers of the multi-layered coiled finned tubes, the coiled fin 6-3-2-2 of an upper layer of adjacent two layered of the multi-layers coiled finned tube 6-3-2 contacts with the plurality of second positioning sheets 6-3-2-3 of a lower layer of the adjacent two layers of the multi-layers coiled finned tube 6-3-2 through tightening the nut, so as to adjust a width of the gap. A thickness of each of the plurality of second positioning sheets is equal to the width of the gap.

The gap-type coil condenser 6-3 provided herein can also be used in a traditional coil heat exchanger. Specifically, a gap channel is formed by compressing the multi-layer coil finned tube through an additional external force, so that laminar flow enhanced heat exchange can also be applied to a traditional coil heat exchanger. The heat transfer coefficient can be increased by 50-200%. After the pressing force is removed, the gap between the coil pipes is increased, facilitating the cleaning and maintenance of the gap-type coil condenser 6-3. In addition, the gap-type coil condenser 6-3 can also act as a coil steam generator, and compared with a traditional coil evaporator, the volume can be reduced by more than 50%.

When the gap-type coil condenser 6-3 is used alone, it can act as a coil steam generator. An inlet of the coil pipe 6-3-5 is provided on a bottom of the gap-type coil condenser 6-3, and an outlet of the coil pipe 6-3-6 is provided on a top of the gap-type coil condenser 6-3. The boiler feed water enters the gap-type coil condenser 6-3 from the inlet of the coil pipe 6-3-5 and flow out of the unitized-gap coil pipe condenser from the outlet of the coil pipe 6-3-6.

The gas-fired steam boiler provided herein has a thermal efficiency of more than 99%, a flue gas resistance of lower than 1000 Pa, a small volume, a small water volume, and a rapid respond for starting and stopping the boiler. Meanwhile, the heat load is uniformly distributed in the gas-fired steam boiler, which can avoid fouling. This unitized-gap structure in the gas-fired steam boiler may also be used as a heat exchanger to substitute the external economizer and condenser of the steam boiler.

What is claimed is:
1. A gas-fired steam boiler, comprising:
   a plurality of heat exchange tubes;
   an upper steam header;
   a lower header;
   a casing;
   a burner;
   a condenser; and
   a chimney;
   wherein the gas-fired steam boiler is vertically arranged;
     the plurality of heat exchange tubes are vertically arranged to form an annular tube row; a space enclosed by the annular tube row is configured as a furnace; a gap channel is provided between adjacent two of the plurality of heat exchange tubes, and is evenly distributed along a circumferential direction; an upper end of each of the plurality of heat exchange tubes extends into the upper steam header, and a lower end of each of the plurality of heat exchange tubes extends into the lower header; the upper steam header and the lower header are both annular; a section of the upper steam header coplanar with an axis of the gas-fired steam boiler is rectangular, circular, or triangular; a section of the lower header coplanar with the axis of the gas-fired steam boiler is rectangular, circular, or triangular; the upper steam header is provided with a steam outlet, a safety valve, a first water level gauge interface, a pressure gauge or pressure sensor interface, and a burner mounting panel; the lower header is provided with a first water inlet, a waste water outlet, a separator for separating the furnace from the condenser, and a second water level gauge interface; a top of the casing is connected to an outer edge of a bottom of the upper steam header; the casing is configured to surround the plurality of heat exchange tubes, the lower header and the condenser; a first annular space is provided between the casing and the plurality of heat exchange tubes, and a second annular space is provided between the casing and the lower header; the first annular space and the second annular space are configured for flow of flue gas; the burner is fixedly arranged on the burner mounting panel; the condenser is arranged below or at an outer side of the lower header, and is configured to condense the flue gas flowing from the second annular space; a bottom of the casing is provided with a condensate collecting plate; and the condensate collecting plate is located below the condenser; the chimney is located at an end of the condensate collecting plate, and is separated from an outer edge of the upper steam header;

the plurality of heat exchange tubes are finned circular tubes;

the condenser is a coil condenser, a combined gap-type condenser, or a gap-type coil condenser;

the burner is a diffusion burner or a full premix burner;

natural gas and air are mixed uniformly in an inlet end of the burner and then enter the furnace from up to bottom to undergo combustion; the flue gas generated by the combustion enters the gap channel under a co-constraint of the burner mounting panel and the separator; after being cooled in the gap channel, the flue gas passes through the first annular space and the second annular space in sequence to enter the condenser for cooling and condensation; the flue gas flowing out of the condenser enters the condensate collecting plate to allow condensed water to be collected and then flows upward to leave the gas-fired steam boiler through the chimney; boiler feed water enters the condenser to absorb residual heat of the flue gas, and then passes through the first water inlet to enter the lower header to be evenly distributed to the finned circular tubes; the boiler feed water absorbs heat and vaporizes into steam while flowing upward along the finned circular tubes; and the steam flows upward to the upper steam header to leave the gas-fired steam boiler from the steam outlet; and each of the finned circular tubes comprises a base tube and an arc-shaped fin; an inner diameter of the arc-shaped fin is greater than an outer diameter of the base tube; the gap channel is formed between the arc-shaped fin of one of adjacent two finned circular tubes and the base tube of the other of the adjacent two finned circular tubes, and a width of the gap channel is 0.1-4 mm; the arc-shaped fin is configured to fully, half, unilaterally or bilaterally enclose the base tube of an adjacent finned circular tube; for each of the finned circular tubes, an outer circumference of the base tube intersects with, is tangent to, or is separated from a circle where an outer circumference of the arc-shaped fin is located; when the outer circumference of the base tube is separated from the circle where the outer circumference of the arc-shaped fin is located, a spacing therebetween is set to be less than 5 mm to ensure that there is enough fusion area between the based tube and the arc-shaped fin; for adjacent two finned circular tubes, an outer circumference of the base tube; a circle where an inner circumference of the arc-shaped fin of one finned circular tube is located is separated from an outer circumference of the base tube of the other finned circular tube to form the gap channel; the base tube is made of a material specified in a gas boiler standard, and the arc-shaped fin is made of a material with a high thermal conductivity; an inner side of the arc-shaped fin is provided with triangular corrugation, sinusoidal corrugation, arc-tangent corrugation, or rectangular corrugation to expand a heat exchange area of the arc-shaped fin, disturb the flue gas, and enhance a heat exchanging effect; a first positioning sheet is spot-welded on a surface of the base tube, and a thickness of the first positioning sheet is equal to the width of the gap channel; an inner surface of the arc-shaped fin abuts against the first positioning sheet on the base tube of an adjacent finned circular tube to allow the width of the gap channel to reach a preset value; two ends of the base tube are respectively welded with a necking connector or necked down to form a necking connector to enable welding when a distance between adjacent two finned circular tubes is too small to be welded; and the necking connector is not connected to the arc-shaped fin.

2. The gas-fired steam boiler of claim 1, wherein the adjacent two finned circular tubes are arranged concentrically or eccentrically; when the adjacent two finned circular tubes are arranged concentrically, a central axis of the base tube of one of the adjacent two finned circular tubes coincides with a central axis of the arc-shaped fin of the other of the adjacent two finned circular tubes, and an angle formed by connecting lines between central axes of base tubes of sequentially-distributed three finned circular tubes is calculated by: 180°−(360°/n), wherein n represents the number of the finned circular tubes arranged along a circumferential direction; when the adjacent two finned circular tubes are arranged eccentrically, an angle formed by connecting lines between central axes of base tubes of the sequentially-distributed three finned circular tubes is calculated by: 180°−(360°/n), wherein n represents the number of the finned circular tubes arranged along the circumferential direction; when the central axis of the base tube of one of the adjacent two finned circular tubes is not coincided with the central axis of the arc-shaped fin of the other of the adjacent two finned circular tubes, each of the finned circular tubes rotates towards the furnace by a preset angle around the central axis of the base tube such that an inlet of the gap channel is larger than an outlet of the gap channel to adapt to volume change of the flue gas during cooling; the finned circular tubes are uniformly arranged along the circumferential direction to form the annular tube row; and when a power of the gas-fired steam boiler is increased, two, three or four annular tube rows are arranged to enlarge the heat exchange area.

3. The gas-fired steam boiler of claim 1, wherein when the base tube and the arc-shaped fin are both made of steel, the base tube and the arc-shaped fin are connected through narrow-gap double-side welding to ensure heat conduction between the base tube and the arc-shaped fin; and when the base tube is made of steel, and the arc-shaped fin is made of a thermally-conductive material, the base tube and the arc-shaped fin are connected by braze welding, and in this case, a contact length between the arc-shaped fin and the base tube is more than 4 mm.

4. The gas-fired steam boiler of claim 1, wherein a welding fixture is adopted to enable precision positioning when the arc-shaped fin is welded with the base tube; the welding fixture comprises a groove and a convex; the groove is configured to accommodate the base tube, and the convex is configured to simulate a base tube adjacent to the base tube; during welding, the base tube is placed in the groove, and the arc-shaped fin is pressed on the convex to allow the base tube to be precisely welded with the arc-shaped fin through narrow-gap submerged arc welding.

5. The gas-fired steam boiler of claim 1, wherein each of the finned circular tubes is prepared from a first circular tube and a second circular tube by welding and cutting, and the first circular tube is larger than the second circular tube in diameter; wherein the second circular tube is configured as the base tube, and the first circular tube is cut along a length direction to remove an arc section, so as to be configured as the arc-shaped fin; or each of the finned circular tubes is prepared from one first circular tube and two second circular tubes by welding and cutting, wherein the one first circular tube is larger than the two second circular tubes in diameter; the two second circular tubes are arranged respectively at two sides of the one first circular tube, and after welded with the two second circular tubes, the one first circular tube is cut along a length direction to obtain two finned circular tubes.

6. The gas-fired steam boiler of claim 1, wherein the coil condenser comprises an isobaric air channel inlet, a coil pipe, and an isobaric air channel outlet; the isobaric air channel inlet is provided on a top of the coil condenser, and the isobaric air channel outlet is provided on a bottom of the coil condenser; an inlet of the coil pipe is provided at the bottom of the coil condenser, and an outlet of the coil pipe is provided at the top of the coil condenser; the coil pipe consists of multiple layers of bare tubes or spiral finned tubes coiled side by side; the flue gas flows from up to bottom to pass through the second annular space to enter the coil condenser from the isobaric air channel inlet and flow out of the coil condenser from the isobaric air channel outlet; the condensed water generated in the coil condenser flows into the condensate collecting plate arranged at the bottom of the casing; and the boiler feed water enters the coil condenser through the inlet of the coil pipe and flows out of the coil condenser from the outlet of the coil pipe.

7. The gas-fired steam boiler of claim 1, wherein the combined gap-type condenser comprises an upper water chamber, a lower water chamber, the finned circular tubes arranged between the upper water chamber and the lower water chamber, an air channel inlet arranged on an outer side of the finned circular tubes, and an outlet plate arranged on a bottom of an inner side of the lower water chamber; the lower water chamber is provided with a second water inlet and a water outlet; a baffle plate is arranged in the upper water chamber and the lower water chamber to guide reciprocating flow of the boiler feed water along a vertical direction between the upper water chamber and the lower water chamber, so as to increase a flow rate of the boiler feed water inside the finned circular tubes and reduce sub-cooled boiling; the arc-shaped fin is configured to fully or bilaterally enclose the base tube of an adjacent finned circular tube to increase a length of the gap channel along a circumferential direction; and the flue gas passes through the second annular space to enter the air channel inlet and flow along the gap channel to enter a cavity formed by the finned circular tubes, and subsequently flows downward with the condensed water to pass through the outlet plate to enter the condensate collecting plate.

8. The gas-fired steam boiler of claim 1, wherein the gap-type coil condenser comprises a circumferential inlet air channel, a multi-layered coiled finned tube arranged inside the circumferential inlet air channel, an outlet plate arranged at a bottom of the multi-layered coiled finned tube, and a plurality of positioning bolts configured to fix the separator and the outlet plate; the multi-layered coiled finned tube comprises a coiled base tube, a coiled fin, and a plurality of second positioning sheets spaced apart; the multi-layered coiled finned tube is prepared by bending a finned circular tube; an outer edge of the outlet plate fits an inner wall of the circumferential inlet air channel such that the outlet plate is capable of moving up and down along the inner wall of the circumferential inlet air channel; each of the plurality of positioning bolts is fixedly arranged on the separator and passes through the outlet plate to fit with a nut arranged below the outlet plate; a gap is formed between coiled fins at adjacent two layers of the multi-layered coiled finned tube; the nut is configured to be tightened to apply a compressive force such that the coiled fin of an upper layer of adjacent two layers of the multi-layered coiled finned tube contacts with the plurality of second positioning sheets on a lower layer of the adjacent two layers of the multi-layered coiled finned tube; a thickness of each of the plurality of second positioning sheets is equal to a width of the gap; when the multi-layered coiled finned tube needs to be cleaned, the nut is loosened to remove the outlet plate to take the multi-layered coiled finned tube out; the flue gas passes through the second annular space to enter the circumferential inlet air channel to be uniformly distributed into the gap formed between adjacent coiled fins of the multi-layered coiled finned tube, and subsequently flows with the condensed water to pass through the outlet plate to enter the condensate collecting plate; an inlet of the multi-layered coiled finned tube is provided on a bottom of the gap-type coil condenser, and an outlet of the multi-layered coiled finned tube is provided on a top of the gap-type coil condenser; and the boiler feed water enters the gap-type coil condenser from the inlet of the multi-layered coiled finned tube and flows out of the gap-type coil condenser from the outlet of the multi-layered coiled finned tube, so as to achieve countercurrent heat exchange with the flue gas.

* * * * *